M. J. ABBOTT.
MACHINE FOR TREATING FISH.
APPLICATION FILED JUNE 3, 1918.
1,371,658.
Patented Mar. 15, 1921.
4 SHEETS—SHEET 1.
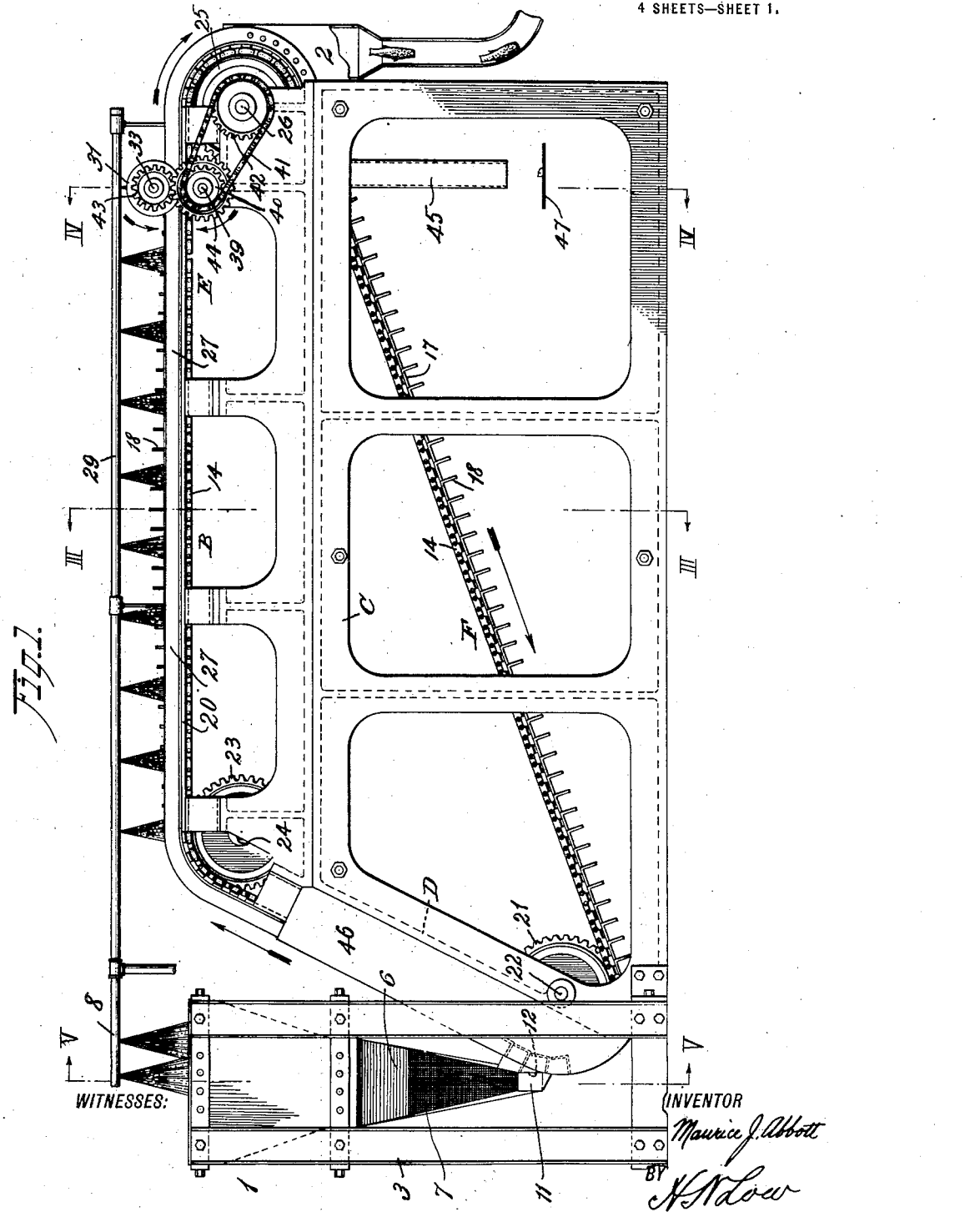

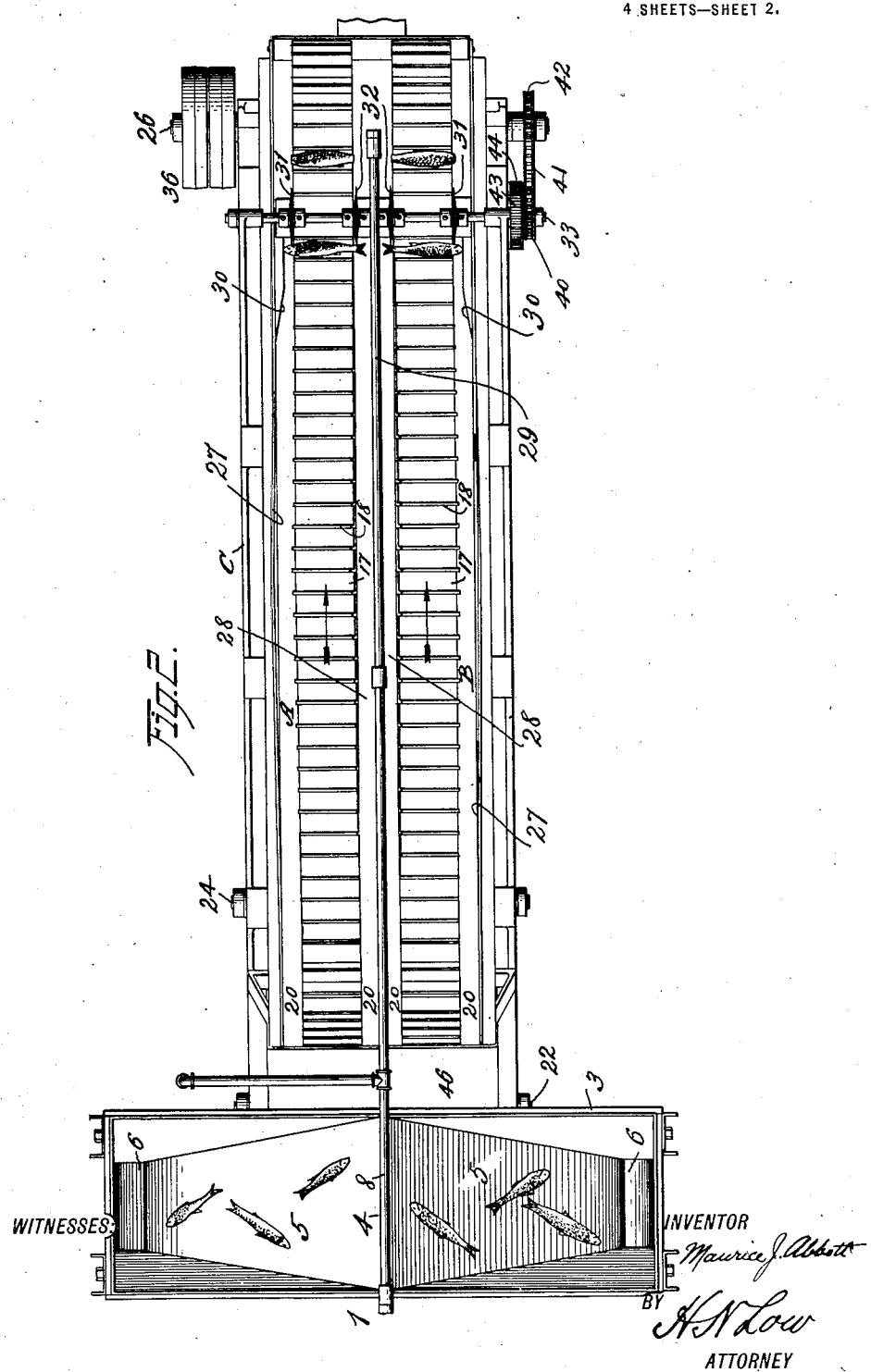

M. J. ABBOTT.
MACHINE FOR TREATING FISH.
APPLICATION FILED JUNE 3, 1918.
1,371,658.
Patented Mar. 15, 1921.
4 SHEETS—SHEET 3.
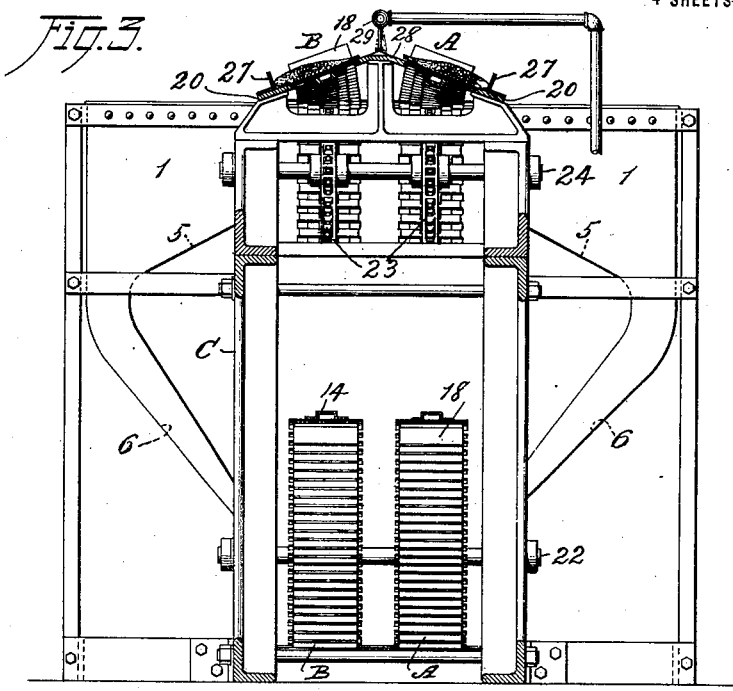
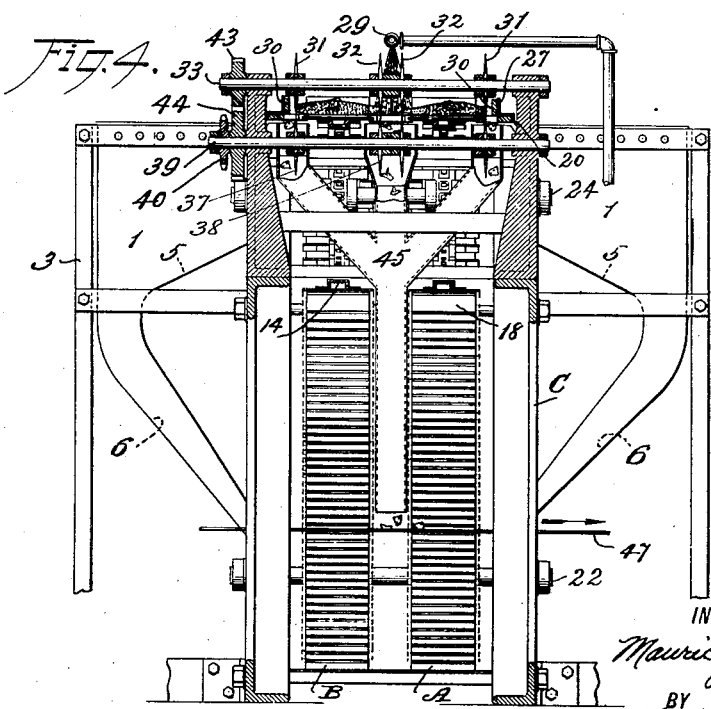
INVENTOR
Maurice J. Abbott
BY
H N Low
ATTORNEY M. J. ABBOTT.
MACHINE FOR TREATING FISH.
APPLICATION FILED JUNE 3, 1918.
1,371,658.
Patented Mar. 15, 1921.
4 SHEETS—SHEET 4.
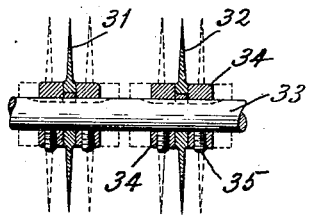
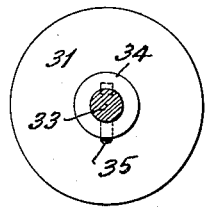
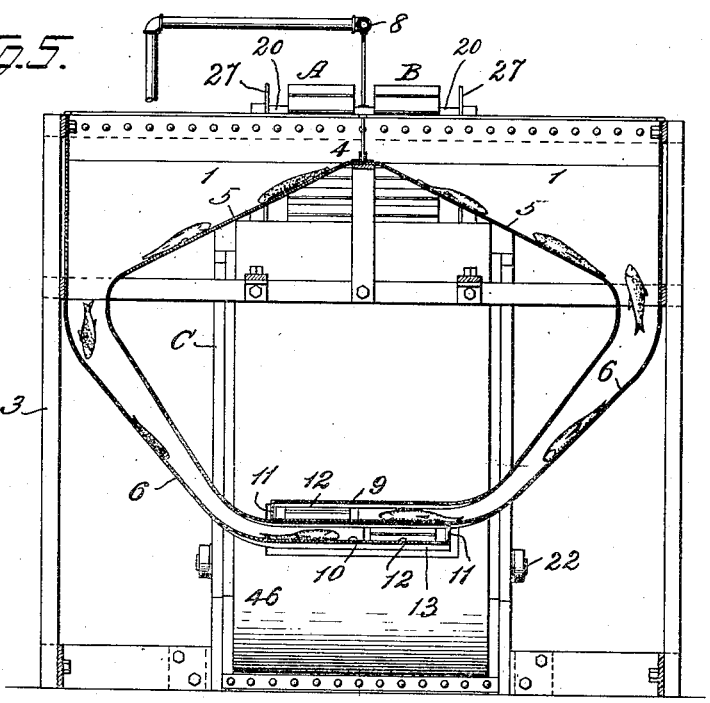
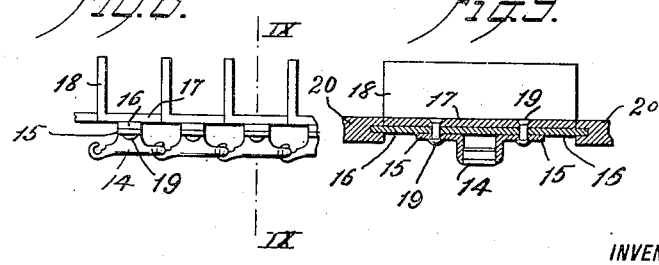
INVENTOR
Maurice J. Abbott
BY
H N Low
ATTORNEY

UNITED STATES PATENT OFFICE.

MAURICE J. ABBOTT, OF NEW YORK, N. Y., ASSIGNOR TO AMERICAN CAN COMPANY, A CORPORATION OF NEW JERSEY.

MACHINE FOR TREATING FISH.

1,371,658.   Specification of Letters Patent.   Patented Mar. 15, 1921.

Application filed June 3, 1918. Serial No. 237,935.

*To all whom it may concern:*

Be it known that I, MAURICE J. ABBOTT, a citizen of the United States, residing at New York, in the county of New York and State of New York, have invented certain new and useful Improvements in Machines for Treating Fish, of which the following is a specification.

The invention relates to the treatment of fish, by the positioning of them and cutting off their heads, and, in the case of sufficiently large fish, their tails also, and is comprised in a mechanism suitable for said purposes.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions, which, for the purpose of explanation, have been made the subject of illustration. In the said drawings:—

Figure 1 is a side elevation of a machine for treating fish, the same embodying my invention.

Fig. 2 is a plan view of the same.

Fig. 3 is a vertical cross section on line III—III of Fig. 1.

Fig. 4 is a similar section on line IV—IV of Fig. 1.

Fig. 5 is a similar section on line V—V of Fig. 1.

Fig. 6 is a detail view in section of the cutting knives, illustrating the manner of adjusting the same for fish of different lengths.

Fig. 7 is an elevation of one of said knives, the shaft being shown in section.

Fig. 8 is a side view of a portion of the fish carrier.

Fig. 9 is a sectional view of the same on line IX—IX of Fig. 8.

Referring to the drawings, 1 is a hopper into which the fish to be treated are fed rapidly, by hand or otherwise. This hopper is arranged at one end of the machine and the fish are automatically carried thence, arranged and cut and their bodies are delivered by a chute 2 (Fig. 1) for further automatic treatment or to suitable collection receptacles. The hopper 1 is carried by a frame 3 and is of special design, for the delivery of two separate rows of positioned fish to the cutting means when the two rows are simultaneously cut, thus doubling the capacity of the machine from a single initial receiving device, the supply of fish to the latter being correspondingly rapid. Said hopper has a central ridge at 4 (Figs. 2 and 5) which divides the supply of fish into two separate bodies each comprising approximately one half of the fish. Inclined slides 5, 5 extend downward from the ridge 4 to receive, conduct and position the fish head downward so they will be delivered to the carrying and cutting mechanism, in a definite arrangement. In order to provide within a narrow compass a length of slide sufficient to allow the fish which may start tail first to turn around (which they will naturally do on a proper surface) the slides 5, 5 communicate with lower inwardly inclined slides 6, 6 on which the sliding and positioning of the fish continue. Suitable parts of such zig-zag slides may be provided with surfaces which are roughened sufficiently to slightly retard the fish and assist their turning, and wire netting 7 (Fig. 1) is suitable for this purpose. In order to keep the fish sufficiently slippery they may be sprinkled with water from a pipe 8 (Fig. 1) as or after they enter the hopper 1. The slides 6 terminate in horizontal portions 9 and 10 (Fig. 5) each having an end stop 11 which is encountered by the head end of the fish, and at this point the extreme bottom parts of the hopper are narrowed (Fig. 1) so as to locate the fish very definitely with respect to the carrier mechanism. Said narrowed parts of the hopper are formed with openings 12 and at said openings the bottom parts 13 of the hopper are inclined toward the carrier, so that each fish is delivered sidewise to the carrier when its sliding is arrested by one of the stops 11.

The carrier consists of two separate parallel and simultaneously moving branches A and B (Fig. 2) consisting of chain belts, the preferred construction of which is best seen in Figs. 8 and 9. Each carrier element consists of a chain link 14 formed with lateral wings 15, a bar forming two projecting guide arms 16 arranged above said wings, a fish-supporting shelf 17 arranged above said guide arms, and a flight 18 which may be in one piece with said shelf. The wings, guide arms and shelf are secured together, as by rivets 19. The arms 16 slide in guides 20 (Fig. 9) fixed to the frame of the machine. Each of said carrier branches A and B is mounted upon lower rear sprockets 21 on a shaft 22, upper rear sprockets 23 on a shaft 24, and upper front sprockets 25 on a shaft 26. These shafts are mounted in suitable bearings in the frame C, the shaft 22 being arranged near the bottom of the hopper so that the carrier will there receive the fish as described, the shaft 24 being arranged so that the carrier will have an inclined leg at D (Fig. 1), and the front shaft 26 is arranged near the chute 2 and so that the carrier will have a substantially horizontal positioning and cutting limb at E and a return limb at F. It is convenient that the fish shall be arranged head outward on each branch of the carrier, and therefore the terminal portions 9 and 10 of the hopper extend past each other as seen in Fig. 5, the right hand slide delivering to the left hand carrier branch and vice versa.

The carrier is caused to move continuously, the inclined leg D in an upward direction, and the rate of movement of the carrier is suitably proportioned to the rate of feeding the fish into the hopper 1, so that approximately one fish is received on each shelf 17 and flight 18 of the carrier as the fish slide from the bottom parts 13 of the hopper, the two branches of the carrier being simultaneously loaded at this point. The horizontal limbs of the carrier B are given a downward tilting movement at their outer edges to accurately gage and position the fish, which are thereby caused to slide a little downward and outward in the compartments of the carrier until their heads are arrested by gages 27 fixed to the frame of the machine. This tilting of the parts of the carrier is accomplished by the shape of the guides 20, the inner guiding elements of which are bent upward or arched at the middle portion of the carrier leg E, as indicated at 28 in Fig. 3. The two inner guiding elements may be formed in one piece, as indicated in said figure, and serve to deflect a spray of water from a pipe 29, so that said water will be directed on to the surfaces of the carrier shelves 17 in sufficient amount to make the fish slippery, if need be, so that they will slide against the gages 27. Before reaching the place of cutting the upper elements of the carrier are returned to substantially horizontal position (Fig. 4), and just before reaching the point of cutting the fish are finally gaged by being shoved a little backward in the compartments of the carrier by means of cam shaped supplemental gages 30 (Fig. 2). The cutting knives are arranged in two pairs, one pair for each branch of the carrier, the knives 31 acting to decapitate the fish and the knives 32 to cut off their tails. These knives are preferably rotary cutters and one pair of the same are illustrated in Fig. 6, being keyed on a transverse shaft 33 but so as to be slidable longitudinally of the shaft so as to have some range of adjustment toward and from each other as indicated in dotted lines in Fig. 6, so as to operate properly upon different sizes of fish. 34 indicates collars which engage the sides of the cutters and hold them in their adjusted position, said collars being secured in adjusted position by set screws 35. Power is imparted to the front shaft 26 for the operation of both branches of the carrier by means of a belt (not shown) which runs on fast and loose pulleys indicated at 36 (Fig. 2).

I preferably combine with the said cutters 31 and 32 a corresponding lower set of cutters 37, 38 fixed upon a cross shaft 39 (Fig. 4). The shaft 39 has fixed thereon a sprocket 40 which is driven by a chain 41 from a sprocket 42 fixed on the main shaft 26. The upper and lower cutter shafts are driven together by intermeshing gears 43, 44 (Fig. 1), the proportions of said gears being preferably such as to drive the upper cutters a little more rapidly, so as to have the effect of confining the fish against the shelves 18 as they are being cut.

45 is a chute for the cut-off heads and tails of the fish (Fig. 4), from which the same may be delivered to a discharge belt 47. 46 is a casing which may be employed to inclose a part of the carrier between the loading point and the gages 27.

It will be understood that the machine is particularly adapted to the handling of large fish, but is still suitable for the handling of smaller grades, with proper adjustment. The machine is ordinarily used for operating on fish of an assorted size, and would be adjusted for a given length of fish and after utilizing all of the fish of that size the knives would be readjusted for the fish of the next size and so on until the supply of fish to be treated is exhausted. It is not necessary, ordinarily, to cut off the tails of the smaller grades of fish, and such small grades may be decapitated only by this apparatus. After the fish have been cut as above described they may be further treated, as may be desired preliminary to packing, either by automatic apparatus or by hand.

What is claimed is:

1. In a machine for treating fish, the combination of a hopper having means for separating the fish into a plurality of sliding streams or bodies, said hopper having means for positioning the fish with their heads in the direction of travel, a carrier leading from the delivery portion of said hopper and divided into branches, one branch for each stream or body of fish, and means for cutting said fish arranged to operate on the fish as they are moved to said cutting means by said branches of the carrier.

2. In a machine for treating fish, the combination of a hopper having means for separating the fish into a plurality of sliding streams or bodies, and an independent branch for each separate body, said branches having means for positioning the fish with their heads in the direction of travel, a carrier leading from the delivery portion of said hopper and divided into branches, one branch for each stream or body of fish, and means for cutting said fish arranged to operate on the fish as they are moved to said cutting means by said branches of the carrier.

3. In a machine for treating fish, the combination of a hopper having means for separating the fish into a plurality of sliding streams or bodies, said hopper having means for positioning the fish with their heads in the direction of travel, a carrier leading from the delivery portion of said hopper and divided into branches, one branch for each stream or body of fish, a transverse shaft extending across said branches of the carrier, and means for cutting said fish arranged on said shaft to operate on the fish as they are moved to said cutting means by said branches of the carrier.

4. In a machine for treating fish, the combination of a hopper having means for separating the fish into a plurality of sliding streams or bodies, said hopper having means for positioning the fish with their heads in the direction of travel, a carrier leading from the delivery portion of said hopper and divided into branches, one branch for each stream or body of fish, and means arranged at the sides of each branch of the carrier for cutting off the heads and tails of the fish as they are moved to said cutting means by said branches of the carrier.

5. In a machine for treating fish, the combination of a hopper having means for separating the fish into a plurality of sliding streams or bodies, an independent branch for each separate body of fish, said branches having means for positioning the fish with their heads in the direction of travel, a carrier leading from the delivery portion of said hopper and divided into branches, one branch for each stream or body of fish, and means arranged at opposite sides of each branch of the carrier for cutting off the heads and tails of the fish as they are moved to said cutting means by said branches of the carrier.

6. In a machine for treating fish, the combination of a hopper having means comprising a ridge and slides leading therefrom for separating the fish into a plurality of sliding streams or bodies, said hopper having means for positioning the fish with their heads in the direction of travel, a carrier leading from the delivery portion of said hopper and divided into branches, one branch for each stream or body of fish, transverse cutter shafts extending across said branches of the carrier above and below the same, and means for cutting said fish arranged on said shafts to coöperate for the cutting of the fish as they are moved to said cutting means by said branches of the carrier.

7. In a machine for treating fish, the combination of a hopper having means for separating the fish into a plurality of sliding streams or bodies and an independent branch for each separate body, said branches having means for positioning the fish with their heads in the direction of travel, a carrier leading from the delivery portion of said hopper and divided into branches, one branch for each stream or body of fish, and means for cutting said fish common to both of said branches of the carrier and arranged to operate on the fish as they are moved to said cutting means by the carrier.

8. In a machine for treating fish, the combination of a hopper having means comprising a ridge and slides leading therefrom for separating the fish into a plurality of sliding streams or bodies and an independent branch for each separate body, said branches having means for positioning the fish with their heads in the direction of travel, a carrier leading from the delivery portion of said hopper and divided into branches, one branch for each stream or body of fish, and cutting means arranged to operate on the fish as they are moved to said cutting means by said branches of the carrier, means for inclining portions of the carrier branches, transverse shafts arranged across both of said branches of the carrier on opposite sides of a limb of the same, and cutters on said shafts.

9. In a machine for treating fish, the combination of a hopper having means for separating the fish into a plurality of sliding streams or bodies and an independent branch for each separate body, said branches having means for positioning the fish with their heads in the direction of travel and terminating in horizontal portions having side delivery openings, carrier means leading from the delivery openings and cutters arranged to operate on the fish as they are moved thereto by said carrier means.

10. In a machine for treating fish, the combination of a hopper having means for separating the fish into a plurality of sliding streams or bodies, an independent branch for each separate body of fish, said branches having means for positioning the fish with their heads in the direction of travel, each branch terminating in a horizontal portion having a side delivery opening, a carrier leading from the delivery portion of said hopper and divided into branches, one branch for each stream or body of fish and leading from said delivery openings, and means for cutting said fish arranged to operate on the fish as they are moved to said cutting means by said branches of the carrier.

11. In a machine for treating fish, the combination of a hopper having means for separating the fish into a plurality of sliding streams or bodies and slides inclined outwardly from said separating means and thence inwardly and terminating in separate fish arresting pockets, carrier means leading from said pockets, and cutters arranged to operate on the fish as they are moved thereto by said carrier means.

12. In a machine for positioning fish, a pair of slides diverging downward from a median line at which fish, delivered thereto, are divided into two sliding bodies, and lower inwardly inclined slides receiving respectively said bodies of fish and directing them for further treatment.

13. In a machine for treating fish, an endless carrier adapted to receive fish in a horizontal position and sidewise to the direction of movement of the carrier, a gage for the fish at the side of the carrier, means for tilting a portion of the carrier sidewise in the direction of the heads of the fish to cause their heads to engage said gage in advance of a cutting station, cutting means at said station at the side of said carrier for operating on the fish, a central deflector for directing sprays of water to said carriers, and a water supply.

14. In a machine for treating fish, an endless carrier adapted to receive fish in a horizontal position and sidewise to the direction of movement of the carrier, a gage for the fish at the side of the carrier which permits the fish to slide outward a little too far relative to the plane of cutting, means for tilting a portion of the carrier sidewise in the direction of the heads of the fish to cause their heads to engage said gage, a supplemental gage to which the gaged fish are advanced by the carrier for shoving them backward to the proper plane of cutting in advance of a cutting station, and cutting means at said station at the side of said carrier for operating on the fish.

15. In a machine for treating fish, the combination of a slide having oppositely inclined portions on which the fish are adapted to slide back and forth as they are being positioned head first, and carrier means leading from said slide and adapted to receive therefrom the fish arranged sidewise to the direction of travel of the carrier and with their heads in the same direction.

16. In a machine for treating fish, an endless carrier adapted to receive fish in a horizontal position and sidewise to the direction of movement of the carrier, a slide having oppositely inclined portions extending downward in planes transverse to said carrier, a gage for the fish at the side of the carrier, means for tilting a portion of the carrier sidewise in the direction of the heads of the fish to cause their heads to engage said gage in advance of a cutting station, and cutting means at said station at the side of said carrier for operating on the fish.

17. In a machine for positioning fish, a pair of slides diverging downward from a median line at which fish, delivered thereto, are divided into two sliding bodies, and lower inwardly inclined slides receiving respectively said bodies of fish and directing them for further treatment, and carrying means arranged at the middle of the machine and receiving the fish from said lower slides.

18. In a machine for treating fish, the combination of a carrier having two rows of fish-holding means, outward and downward slides above said carrier adapted to separate fish, when delivered thereto, into two sliding masses, lower slides directing the fish inward over the carrier, and means for guiding the fish of one mass head-first into one row of said holding means of the carrier and the fish of the other mass head-first into the other row of said holding means.

19. The combination of an endless carrier having means for holding two rows of fish, the fish in a row having their heads arranged in the same direction, slide devices leading from a common place of deposit and in diverse directions whereby the fish are separated into two masses, and thence leading respectively to said rows of holding devices of the carrier, the fish being turned head-first as they pass along said slide devices.

In testimony whereof I affix my signature hereto.

MAURICE J. ABBOTT.

Witnesses:
D. F. MENNIS,
W. L. BALD.